(12) United States Patent
Dharap

(10) Patent No.: US 6,256,633 B1
(45) Date of Patent: Jul. 3, 2001

(54) CONTEXT-BASED AND USER-PROFILE DRIVEN INFORMATION RETRIEVAL

(75) Inventor: Chanda Dharap, Fremont, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/104,491

(22) Filed: Jun. 25, 1998

(51) Int. Cl.$^7$ .............................. G06F 17/30; G06F 17/60
(52) U.S. Cl. .................................... 707/10; 707/3; 707/4; 707/5; 705/10; 705/14
(58) Field of Search ................................ 707/3, 4, 5, 10; 705/10, 14

(56) References Cited

U.S. PATENT DOCUMENTS

| | | | |
|---|---|---|---|
| 5,293,552 | | 3/1994 | Aalbersberg ..................... 364/419.19 |
| 5,664,063 | * | 9/1997 | Johnson et al. ..................... 395/101 |
| 5,694,594 | * | 12/1997 | Chang ..................... 707/6 |
| 5,761,662 | * | 6/1998 | Dasan ..................... 707/10 |
| 5,771,381 | * | 6/1998 | Jones et al. ..................... 395/653 |
| 5,973,683 | * | 10/1999 | Cragun et al. ..................... 345/327 |
| 5,978,799 | * | 11/1999 | Hirsch ..................... 707/4 |
| 5,995,597 | * | 11/1999 | Woltz et al. ..................... 379/93.24 |
| 6,009,410 | * | 12/1999 | LeMole et al. ..................... 705/14 |
| 6,021,403 | * | 2/2000 | Horvitz et al. ..................... 706/45 |

OTHER PUBLICATIONS

"Incremental Relevance Feedback for Information Filtering", by J. Allan, Center for Intelligent Information Retrieval Dept. of Computer Science, Univ. of Mass., Amherst, Mass.

"A Deductive Data Model for Query Expansion", by K. Jarvelin et al., Dept. of Information Studies, Dept. of Computer Science, Univ. of Tampere, Finland.

"Experiments on Using Semantic Distances Between Words in Image Caption Retrieval", by A.F. Smeaton et al, School of Computer Applications, Dublin City Univ., Dublin, Ireland.

Tan et al., Learning User Profiles for personalized information dissemination, Neural Networks Proceedings, IEEE World Congress on Computational Intelligence, vol. 1, pp. 183–188, May 1998.*

Park et al, A New Generation of a User Profile for Information Filtering on the Internet, IEEE Information Networking, Proceedings., Twelfth International Conference, pp. 261–264, Jan. 1998.*

* cited by examiner

*Primary Examiner*—Thomas Black
*Assistant Examiner*—Frantz Coby
(74) *Attorney, Agent, or Firm*—Peter Verdonk

(57) ABSTRACT

A user is enabled to navigate through an electronic data base in a personalized manner. A context is created based on a profile of the user, the profile being at least partly formed in advance. Candidate data is selected from the data base under control of the context and the user is enabled to interact with the candidates. The profile is based on topical information supplied by the user in advance and a history of previous accesses from the user to the data base.

5 Claims, 1 Drawing Sheet

CONTEXT-BASED AND USER-PROFILE DRIVEN INFORMATION RETRIEVAL

FIELD OF THE INVENTION

The invention relates to a method and system for enabling retrieval of an information item from an information base in an electronic network.

BACKGROUND ART

Rapidly expanding information archives provide access to terabytes of electronic data, e.g., electronic museums, electronic newspapers, musical archives, digital libraries, software archives, mailing lists, up-to-date weather information and geographic data. Consequently, current advances in information technology are driven by the need to increase the effectiveness of information access and retrieval.

Traditionally, information providers try to overcome the inadequacies of information retrieval by providing fast and powerful search engines, see, for example, U.S. Pat. No. 5,293,552 (PHN 13,666) herewith incorporated by reference. Retrieval mechanisms based on keywords typically return a large set of documents, but are not very precise in their return. Examples of searching systems are commonly available search engines, databases and library lookup systems. The user interacts with the system by providing a query with sufficient information and gets back a set of documents that more or less match the query.

Traditional approaches have devised mechanisms to map a user's query to a document based on overlapping terms or concept words between the query and the document terms.

One known approach is known from "Experiments on Using Semantic Distances Between Words in Image Caption Retrieval", Alan F. Smeaton and Ian Quigley, Proceedings of the 19th Annual International A CM SIGIR Conference on Research and Development in Information Retrieval, August 1996, Zürich, Switzerland. This approach uses a quantitative measure of semantic similarity between index terms for queries and documents.

Another recent method is described in "A Deductive Data Model for Query Expansion", Kalervo Jarvelin, Jaana Kristensen, Timo Niemi, Eero Sormunen and Heikki Keskustalo, Proceedings of the 19th Annual International ACM SIGIR Conference on Research and Development in Information Retrieval, August 1996, Zürich, Switzerland. This method introduces concept-based query expansion, where each concept is expanded to a disjunctive set of concepts on the basis of conceptual relationships pointed out by the user.

Yet another known idea is proposed in "Incremental Relevance Feedback for Information Filtering", James Allan, Proceedings of the 19th Annual International ACM SIGIR Conference on Research and Development in Information Retrieval. August 1996, Zürich, Switzerland. This idea relates to relevance feedback techniques that process shifts in user interest patterns over a period of time. The user feeds back notions of which query results he/she believes are relevant to the current query.

OBJECT OF THE INVENTION

A key to effective information retrieval lies in mechanisms that increase the precision values for documents retrieved. One problem with existing search systems is that if the query is not very precise, the user is left with the task of scanning through a large of amount of result data to identify documents of interest, because a large percentage of the information retrieved is not relevant to the user. Another drawback is that the known retrieval methods supply a set of results that is restricted to the literal search criteria entered at that moment and not much else. That is, the electronic information retrieval does not have the advantages of real-life browsing at a bookstore where an interesting book cover may catch a person's eye and divert his/her attention or awaken his/her interest. Consequently, the information provider is unable to guide the user to other, yet related, works that could be of interest to this particular user.

It is therefore an object of the invention is to provide a method for retrieving information that improves the quality of the result data.

SUMMARY OF THE INVENTION

To this end, the invention provides a method of enabling a user to navigate through an electronic document base. The invention provides a method of enabling a user to query an electronic document base. The user supplies at least one query object, e.g., a word, a geometrical shape or pattern, a tune or rhythm representing one or more bars of a piece music, etc. The method comprises determining a topical context for the query by means of extracting from an access history, e.g., at least one preceding query, of the user to the document base at least one concept object associated with the current query. The concept object is used to create at least part of a user profile. Then one or more documents are identified in the document base under control of the user profile. The profile is updated based on the content of the identified document.

The invention increases the effectiveness of browsing wide-area information by means of focusing primarily on the user's interest as given by the user's access history in terms of the results of previous queries. Taking these results into account for next queries creates a context that enables interpreting the current query object in view of what currently is likely to be of interest to this specific user. The context for the current query is used to update the user's profile. The profile itself is used as a recommendation for mapping relevant information form the information provider's topic space, also referred to as document base, onto the user's search space.

The profile gets updated dynamically in response to the user's interactions with the document base. Accordingly, the dynamic part reflects the path taken within the provider's information space in the course of the user's search. Preferably, the profile has also a static part that reflects the user's long-term interests. The term "static' is used to indicate a time scale substantially slower than that of the dynamic part. The static part is determined by, for example, letting the user provide topical information about his/her fields of attention the first time that the user interacts with the document base. Such entries can be changed manually in due course. Alternatively or subsidiarily, statistical analysis of a statistically relevant number of results over time enables finding themes that stay substantially constant.

The preferred embodiment of the invention allows the user to retain a constant theme in his/her profile (static part) as well as to influence the profile by new issues (dynamic part) generated while browsing the provider's information space. This latter aspect of the invention gives a mechanism to information-providers to attract the user's interest while the latter is browsing at their sites.

Preferably, the user is allowed to disable and enable the static and/or dynamic part of his/her profile so as to be able to choose whether or not to use the profiling in retrieving information.

Thus, the invention enables clustering and re-clustering of the information space in a manner effective for highly personalized browsing. The invention can be regarded as an automatic version of the "refine" button as provided by various search engines found on the Internet.

For the example with the music data base mentioned above, see U.S. patent application Ser. No. 08/840,356, filed Apr. 28, 1997 (PHA 23,241), herein incorporated by reference.

BRIEF DESCRIPTION OF THE DRAWINGS

The invention is explained by way of example and with reference to the accompanying drawings, wherein.

PREFERRED EMBODIMENTS

Figure 1:
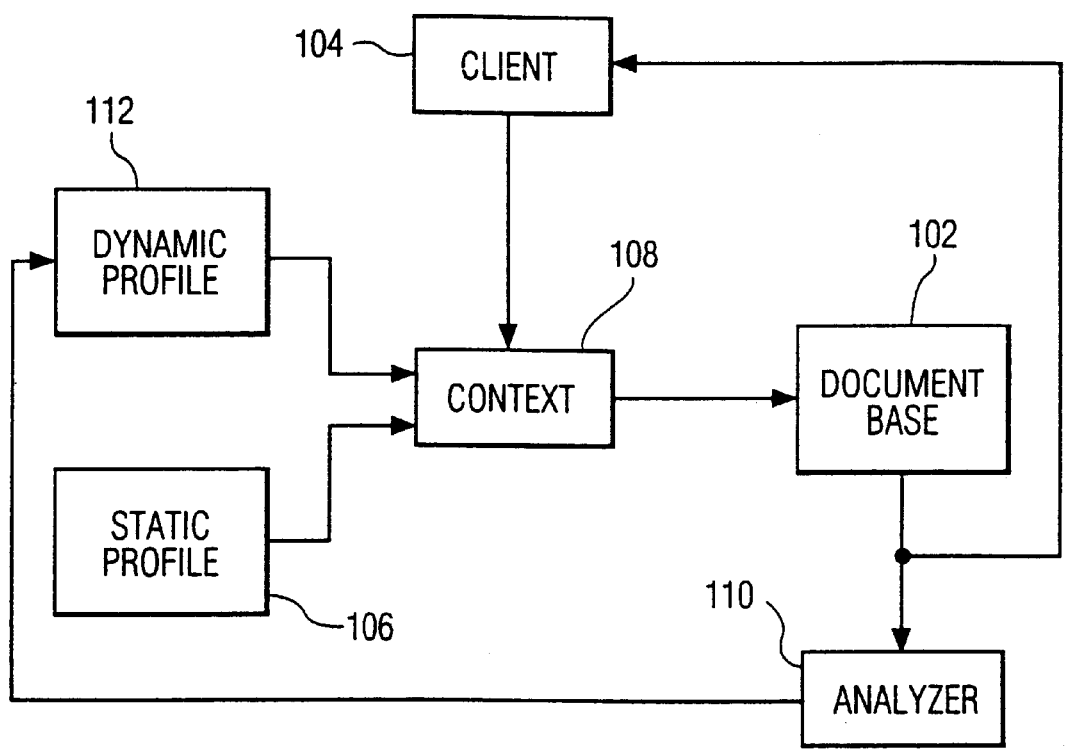
FIG. 1 is a diagram illustrating the method of the invention.

FIG. 1 is a diagram of a system 100 illustrating the method according to the invention by way its main functionalities. System 100 has an electronic document base 102 and a user terminal or client 104 through which the user interacts with document base 102. For example, client 104 comprises an alphanumeric keyboard or a speech coder (not shown) and a display device (not shown). The user enters, in this example, query words into system 100 through the keyboard or speech coder and gets visual feedback on his/her entry and the query results as explained below.

System 100 comprises a static profile memory 106 that stores indications of what represents this individual user's long-term interests. For example, the user has provided topics that represent her/his main fields of interest upon being introduced to system 100 for the first time. Alternatively, if, for example, the user's cultural and social background and profession are known, the system may assign by default this particular user to a particular category typical of this type of user. Alternatively, or subsidiarily, the user may specify that she/he is definitely NOT interested in specific topics so as to be able to exclude certain categories of documents right from the outset. All this information contributes to creating a long-term profile of this user which is stored in memory 106.

It is assumed that the user is interacting with system 100 for the first time and enters a query word through client 104. System 100 now enables interpreting this query word within a certain context that is determined by the static profile as stored in memory 106. System 100 has a context generator 108 that generates one or more additional keywords associated with the topic under consideration as given by the user's entry. This is done, for example, via an algorithm that is based on a topical partitioning of the information space spanned by the documents in document base 102. Alternatively, the keyword entered through client 104 is mapped onto semantically similar terms in a dictionary. The mapping is controlled by static profile 106 to eliminate unrelated topics. For example, the entries "processor" and "micro" can be mapped onto the topic "computers" via "microprocessors", but also onto the topic "cooking" via "food processor" and "microwave oven". If the user is a rabid amateur cook with much too little time because she/he is a very busy specialist in parallel data processing architectures, both topics may be relevant and the context should include both. If the static profile indicates that the user is only interested in one of these categories, the context should cause documents of the other category to be ignored. If the static profile comprises neither indication, the context should permit documents of both categories to be retrieved if present in document base 102. In order to achieve this selection, the keyword and one or more context keywords are entered into the search engine of document base 102. If static profile has a category "NOT", i.e., of one or more topics to be excluded in advance from the search, the search engine is caused to execute the Boolean operation so as to discard unwanted documents that happen to comply literally with the "NOT" conditions.

It is assumed that document base 102 identifies a large number of documents that match the combination of the words entered by the user within the context generated by generator 108. The identifiers of these documents are returned to the user, for example in the format used by the PlanetSearch service of Philips Electronics at http://www.planetsearch.com/, whose search engine is described on U.S. pat. No. 5,293,552. The results in this format are represented as ranked according to relevance, and the relative contribution of each keyword to each specific result is indicated by a colored bar. The results of this query are also sent to an analyzer 110. Analyzer 110 generates a set of concept keywords based on these results. The generation algorithm uses, for example, the topical partitioning of the information space of base 102 and a weighted topical dictionary. Such algorithms are known in the art. These concept keywords are then stored in a memory 112 that represents the user's dynamic profile. If the user starts a new query by entering one or more new key words, e.g, based on the results returned in the previous query, a similar procedure as outlined above is followed. The difference now is that the content of memory 112 is being taken into account as well in order to determine the context. The content of memory 112 thus indicates the path taken by the user while browsing the information space of document base 102.

The user may change his/her focus of interest during his/her interaction with document base 102. If the user enters the next time one or more query words that relate to a topic that bears no relation to the context of the preceding query, system 100 detects a context shift. Context shifts are being monitored and are used to change the user's dynamic profile 112 in order to modify the context of the previous queries. Upon a context shift, dynamic profile 112 does initially not affect the query, as there are no concept words stored that relate to the new topic.

The above is illustrated by the following examples. Assume that the user has been interacting with system 100 using in succession the query words "dining", "recipes", "curry". The context derived from these entries is "cooking" or "food preparation". If the user now enters keywords "processor" and "micro", the dynamic part of the profile lets these terms be interpreted as "food processor" and "microwave oven", respectively, and identifies documents relating to the latter issues. Had the user been interacting with system 100 using, e.g., "parallel", "computing" and "algorithms", the same terms "processor" and "micro" would have been interpreted as "data processor" or "signal processor" and "microprocessor" within the context established by the dynamic profile as relating to "data processing" and "computers".

As another example, assume that the user is initially interested in ideas on how to invest money. A user looking for a document on "investing" may have started off by entering via client 104 the keywords "investments" and "banking" into system 100. System 100 processes these terms and retrieves documents that match this query. System 100 returns results to client 104 that represent the documents retrieved. The queries are then enhanced by adding and dropping a few keywords. The user browses through these results and gets attracted to the idea of on-line banking. In the next query the user adds a term "on-line" and queries system 100 anew. This leads towards articles about a bill pay system of a particular bank and the query is further enhanced by adding the term "pay bill". After arriving at a desired result, the user either quits the search, or shifts interest to another topic altogether, say, "computer networking architectures". This is referred to as a context shift: a shift in the query that indicates a change of interest. By understanding such context shifts it is possible to narrow the user's search path. For example, a search for "ATM" could imply either information regarding "asynchronous transmission mode networking protocol" or "Automated Teller Machines". Within the context of banking, the term "ATM" would have led to documents on "Automated Teller Machines". Within the context of "networking architectures", the term ATM now leads to documents concerned with "asynchronous transmission mode".

A context shift is detected using the generation algorithm mentioned above that uses a topical partitioning of the information space of document base 102 and a weighted topical dictionary. If, for example, the distance between a newly entered keyword and the keywords representing the current dynamic profile in memory 112 is too large, it is safe to assume that there is a context shift. This distance is obtained, for example, by computing a degree of overlap between successive query terms. The query terms used to compute the shift include the terms added on by analyzer 110. The larger the overlap, the higher the probability that the query takes place within the same context. If there is no overlap it is safe to assume that there is a context shift. When a context shift is detected, system 100 automatically maps the user's queries to another part of the topical information space. At the same time, system 100 continues to build up an access history as the user now browses a different part of document base 102.

I claim:

1. A method of enabling a user to query an electronic document base system, the method comprising the steps of:

forming a user profile of the user containing a dynamic list of concept objects extracted by the system from an access history of the user;

entering at least one query object by the user into the system for a current query; and performing the following steps by the system:

determining a topical context for the current query from the at least one query object and the user profile and generating at least one context object for the current query representing the determined topical context;

identifying at least one document in the document base under control of the at least one query object and the at least one generated context object; and updating the access history of the user based on the current query.

2. The method of claim 1, wherein the access history is formed by logging queries and other interactions of the user and the system.

3. The method of claim 1, wherein the step of updating the access history comprises the steps of:

generating a further concept object based on the current query;

verifying if the further concept object is absent from the user profile;

storing the further concept object in the user profile if the further concept object was absent; and skipping the storing step if the further concept object was present in the user profile.

4. The method of claim 1, comprising enabling the user to specify a part of the user profile representing a profile of the user's interests.

5. The method of claim 4, wherein the user is enabled to specify unwanted topics in the user profile and documents identified by the specified unwanted topics are excluded from being made available to the user.

* * * * *